US005616383A

United States Patent [19]
Weder

[11] Patent Number: 5,616,383
[45] Date of Patent: *Apr. 1, 1997

[54] BASKET LINER HAVING A BONDING MATERIAL THEREON AND METHOD

[75] Inventor: Donald E. Weder, Highland, Ill.

[73] Assignee: Southpac Trust International, Inc., Oklahoma City, Okla.

[*] Notice: The term of this patent shall not extend beyond the expiration date of Pat. No. 4,773,182.

[21] Appl. No.: 463,907

[22] Filed: Jun. 5, 1995

Related U.S. Application Data

[60] Division of Ser. No. 113,873, Aug. 27, 1993, abandoned, and a continuation-in-part of Ser. No. 24,573, Mar. 1, 1993, abandoned, and Ser. No. 781,040, Oct. 21, 1993, abandoned, which is a continuation-in-part of Ser. No. 649,379, Jan. 31, 1991, Pat. No. 5,111,638, which is a continuation of Ser. No. 249,761, Sep. 26, 1988, abandoned, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned, said Ser. No. 24,573, is a continuation of Ser. No. 464,644, Jan. 16, 1990, Pat. No. 5,208,027, which is a continuation of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned, said Ser. No. 113,873, is a continuation-in-part of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a division of Ser. No. 249,761, Sep. 26, 1988, abandoned, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.$^6$ .................................................. B29D 22/00
[52] U.S. Cl. .................. 428/35.7; 428/34.1; 220/470
[58] Field of Search .................. 428/35.8, 36.9, 428/36.91, 36.92, 35.7, 34.1; 47/66, 72; 206/44 K, 44 B, 423, 499; 220/912

[56] References Cited

U.S. PATENT DOCUMENTS

| D. 254,659 | 4/1980 | Karotseris | D11/143 |
|---|---|---|---|
| 557,526 | 3/1896 | Egge | 156/212 |
| 732,889 | 7/1903 | Paver | 229/92 |
| 920,313 | 5/1909 | Franklin | 220/491 |
| 1,069,675 | 8/1913 | Claussen | 229/1.5 B |
| 1,102,499 | 7/1914 | Haist | 383/33 |
| 1,446,563 | 2/1923 | Hughes | 47/72 |
| 1,525,015 | 2/1925 | Weeks | 53/449 |
| 1,863,216 | 6/1932 | Wordingham | 206/284 |

(List continued on next page.)

FOREIGN PATENT DOCUMENTS

| 2610604 | 8/1988 | France . |
| 560532 | 4/1975 | Switzerland . |

OTHER PUBLICATIONS

"The Simple Solution For Those Peak Volume Periods, Speed Cover®", 1989©, a brochure, 4 pages, published by Highland Supply Corporation, 1111 Sixth St., Highland, IL 62249.

Speed Sheets® And Speed Rolls, ©1989, a brochure, 2 pages, published by Highland Supply Corporation, 1111 Sixth Street, Highland, IL 62249.

"A World Of Cut Flower And Pot Plant Packaging," a brochure, 6 pages, by Klerk's Products Manufacturing Inc., date unknown.

*Primary Examiner*—James J. Seidleck
*Assistant Examiner*—Michael A. Williamson
*Attorney, Agent, or Firm*—Dunlap & Codding, P.C.

[57] ABSTRACT

A basket liner constructed from a preformed sheet of material, the basket liner having an upper end, a lower end, an opening in the upper end forming an inner surface, and an outer periphery forming an outer surface, a bonding material disposed on a portion of the outer surface of the basket liner, the basket, or both, for bondingly connecting the basket liner to the basket. A method for disposing a basket liner into a basket.

54 Claims, 6 Drawing Sheets

U.S. PATENT DOCUMENTS

| | | | |
|---|---|---|---|
| 1,868,853 | 7/1932 | Sievers | 47/72 |
| 1,978,631 | 10/1934 | Herrlinger | 428/163 |
| 2,048,123 | 7/1936 | Howard | 229/87 |
| 2,110,612 | 3/1938 | Skinner et al. | 229/14 |
| 2,170,147 | 8/1939 | Lane | 206/56 |
| 2,204,664 | 6/1940 | Clark | 18/56 |
| 2,239,398 | 4/1941 | Palmer | 229/14 |
| 2,260,230 | 10/1941 | Olson | 206/44 |
| 2,278,673 | 4/1942 | Savada et al. | 154/43 |
| 2,302,259 | 11/1942 | Rothfuss | 41/10 |
| 2,328,798 | 9/1943 | Gardner | 18/56 |
| 2,355,559 | 8/1944 | Renner | 229/8 |
| 2,367,749 | 1/1945 | Barbieri | 93/60 |
| 2,371,985 | 3/1985 | Freiberg | 206/46 |
| 2,411,328 | 11/1946 | MacNab | 33/12 |
| 2,458,246 | 1/1949 | Brereton | 220/84 |
| 2,482,981 | 9/1949 | Kamrass | 41/13 |
| 2,510,120 | 6/1950 | Leander | 117/112 |
| 2,529,060 | 11/1950 | Trillich | 117/68.5 |
| 2,544,075 | 3/1951 | Ernst et al. | 150/49 |
| 2,573,770 | 11/1951 | Meadow | 150/28 |
| 2,621,142 | 12/1952 | Wetherell | 154/117 |
| 2,622,380 | 12/1952 | Snyder | 53/15 |
| 2,736,065 | 2/1956 | Wilcox | 18/56 |
| 2,736,680 | 2/1956 | Kidwell | 154/139 |
| 2,780,401 | 2/1957 | Stevens | 229/2.5 |
| 2,790,573 | 4/1957 | Warren | 217/122 |
| 2,822,287 | 2/1958 | Avery | 117/14 |
| 2,845,735 | 8/1958 | Werner | 41/10 |
| 2,846,060 | 8/1958 | Yount | 206/58 |
| 2,883,262 | 4/1959 | Borin | 21/56 |
| 2,967,652 | 1/1961 | Canfield et al. | 229/5.5 |
| 3,013,689 | 12/1961 | Shropshire | 215/100 |
| 3,022,605 | 2/1962 | Reynolds | 47/58 |
| 3,113,712 | 12/1963 | Kindseth | 229/14 |
| 3,121,647 | 2/1964 | Harris et al. | 118/202 |
| 3,130,113 | 4/1964 | Silmann | 161/97 |
| 3,148,799 | 9/1964 | Meroney | 220/63 |
| 3,166,461 | 1/1965 | Sada | 156/447 |
| 3,189,502 | 6/1965 | Little | 156/210 |
| 3,215,330 | 11/1965 | Thomas | 229/14 |
| 3,271,922 | 9/1966 | Wallerstein et al. | 53/3 |
| 3,318,748 | 5/1967 | Hurst | 156/224 |
| 3,436,007 | 4/1969 | Rausing | 229/14 |
| 3,466,214 | 9/1969 | Polk et al. | 156/213 |
| 3,488,022 | 1/1970 | Vittori | 248/152 |
| 3,508,372 | 4/1970 | Wallerstein et al. | 53/3 |
| 3,514,012 | 5/1970 | Martin | 220/63 |
| 3,542,616 | 11/1970 | Cain et al. | 156/224 |
| 3,620,366 | 11/1971 | Parkinson et al. | 206/59 C |
| 3,681,105 | 8/1972 | Milutin et al. | 117/15 |
| 3,757,990 | 9/1973 | Buth | 220/63 R |
| 3,775,932 | 12/1973 | Jeney | 53/22 A |
| 3,791,902 | 2/1974 | Hanke et al. | 156/212 |
| 3,927,821 | 12/1975 | Dunning | 229/14 |
| 3,962,503 | 6/1976 | Crawford | 428/40 |
| 4,043,077 | 8/1977 | Stonehocker | 47/66 |
| 4,054,697 | 10/1977 | Reed et al. | 428/40 |
| 4,118,890 | 10/1978 | Shore | 47/28 |
| 4,170,618 | 10/1979 | Adams | 264/101 |
| 4,216,256 | 5/1980 | Lindner | 428/66 |
| 4,216,620 | 8/1980 | Weder et al. | 47/72 |
| 4,293,353 | 10/1981 | Pelton et al. | 156/69 |
| 4,300,312 | 11/1981 | Weder et al. | 47/72 |
| 4,330,066 | 5/1982 | Berliner | 215/1 C |
| 4,333,267 | 6/1982 | Witte | 47/84 |
| 4,379,101 | 5/1983 | Smith | 264/40.3 |
| 4,380,564 | 4/1983 | Cancio et al. | 428/167 |
| 4,413,725 | 11/1983 | Bruno et al. | 206/0.82 |
| 4,508,223 | 4/1985 | Catrambone | 206/423 |
| 4,546,875 | 10/1985 | Zweber | 206/423 |
| 4,733,521 | 3/1988 | Weder et al. | 53/530 |
| 4,765,464 | 8/1988 | Risvedt | 206/0.82 |
| 5,111,638 | 5/1992 | Weder | 53/397 |

BASKET LINER HAVING A BONDING MATERIAL THEREON AND METHOD

CROSS-REFERENCE TO RELATED APPLICATIONS

This is a divisional of application Ser. No. 08/113,873 filed on Aug. 27, 1993 now abandoned which is a continuation-in-part of U.S. Ser. No. 07/968,798, filed Oct. 30, 1992, entitled METHOD FOR WRAPPING AN OBJECT WITH A MATERIAL HAVING PRESSURE SENSITIVE ADHESIVE THEREON, now U.S. Pat. No. 5,369,934, which is a continuation of Ser. No. 07/865,563, filed Apr. 9, 1992, entitled METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL, now U.S. Pat. No. 5,245,814, which is a continuation of U.S. Ser. No. 07/649,379, filed Jan. 31, 1991, entitled METHOD FOR WRAPPING AN OBJECT WITH A MATERIAL HAVING PRESSURE SENSITIVE ADHESIVE THEREON, now U.S. Pat. No. 5,111,638, which is a divisional of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now ABANDONED, which is a continuation-in-part of U.S. Ser. No. 219,083, filed Jul. 13, 1988, entitled ARTICLE FORMING SYSTEM, now U.S. Pat. No. 4,897,031, which is a continuation of Ser. No. 004,275, filed Jan. 5, 1987, entitled ARTICLE FORMING SYSTEM, now U.S. Pat. No. 4,773,182 which is a continuation of Ser. No. 613,080, filed May 22, 1984, now ABANDONED.

This application is also a continuation-in-part of U.S. Ser. No. 08/024,573, filed Mar. 1, 1993, entitled ARTICLE FORMING SYSTEM, now abandoned, which is a continuation of Ser. No. 07/464,694, filed Jan. 16, 1990, entitled ARTICLE FORMING SYSTEM, now U.S. Pat. No. 5,208,027, which is a continuation of U.S. Ser. No. 219,083, filed Jul. 13, 1988, entitled ARTICLE FORMING SYSTEM, now U.S. Pat. No. 4,897,031, which is a continuation of Ser. No. 004,275, filed Jan. 5, 1987, entitled ARTICLE FORMING SYSTEM, now U.S. Pat. No. 4,773,182 which is a continuation of Ser. No. 613,080, filed May 22, 1984, now ABANDONED.

This application is also a continuation-in-part of U.S. Ser. No. 07/781,040, filed Oct. 21, 1991, entitled BASKET LINING MATERIAL HAVING AN ADHESIVE OR COHESIVE THEREON AND METHOD, now abandoned, which is a continuation-in-part of U.S. Ser. No. 07/649,379, filed Jan. 31, 1991, entitled METHOD FOR WRAPPING AN OBJECT WITH A MATERIAL HAVING PRESSURE SENSITIVE ADHESIVE THEREON, now U.S. Pat. No. 5,111,638, which is a continuation of U.S. Ser. No. 07/249, 761, filed Sep. 26, 1988, entitled METHOD FOR WRAPPING AN OBJECT WITH A MATERIAL HAVING PRESSURE SENSITIVE ADHESIVE THEREON, now ABANDONED, which is a continuation-in-part of U.S. Ser. No. 219,083, filed Jul. 13, 1988, entitled ARTICLE FORMING SYSTEM, now U.S. Pat. No. 4,897,031, which is a continuation of Ser. No. 004,275, filed Jan. 5, 1987, entitled ARTICLE FORMING SYSTEM, now U.S. Pat. No. 4,773, 182 which is a continuation of Ser. No. 613,080, filed May 22, 1984, now ABANDONED.

2

FIELD OF THE INVENTION

This invention generally relates to basket liners and, more particularly, to basket liners having a bonding material thereon, and methods of using same.

DESCRIPTION OF THE PREFERRED EMBODIMENTS

Embodiments and Method of FIGS. 1–4

Basket liners are used to isolate the contents of a basket from the basket itself. In the past, basket liners have been made from cloth, or similar materials, and hand-sewn into a basket, and have been formed from plastic into a short, bowl-shaped, non-flexible bowls or saucers which are used as basket liners, and have been disposed in a basket. These forms of basket liners have a number of problems.

First, basket liners made from cloth are usually sewn into baskets made in third world countries. The cloth liners frequently are poorly sewn, and rip out during shipment and/or use. Further, in third world countries, where a large number of the commercially available baskets are made, the cloth lining material is frequently sewn into the basket by the same person who made the basket. Therefore, labor costs, and concerns regarding sanitary conditions of both the basket and the liner arise. Next, when a non-flexible plastic bowl or saucer is disposed in the basket, it is often difficult to nest (stack one basket inside the next, and so on) the baskets together for shipment. Further, the plastic bowl or saucer frequently falls out of the basket. And because of its rigidity and lack of significant flexibility, the plastic bowl or saucer cracks, thereby defeating the purpose of isolating the contents of the basket from the basket. Finally, the non-flexible plastic bowl or saucer is usually considerably more expensive than sheet material.

The present invention contemplates the use of a flexible sheet of material pre-formed into the shape of a basket liner. The present basket liner is characteristically substantially flexible and non-tearable, and capable of being made in many different shapes and sizes to conform to the shape and size of the inner periphery of many different baskets. The basket liner disclosed herein also may have a bonding material disposed upon at least a portion of the outer periphery of the basket liner, thereby permitting a connection between the inner periphery and the inner surface of the basket and the outer periphery and the outer surface of the basket liner. Such a connection permits easier nesting (stacking) of baskets having basket liners disposed therein for shipment. Such basket liners may be pre-formed in sanitary conditions, and may be maintained in sanitary conditions, before being disposed in a basket. Finally the costs of making the presently disclosed basket liners and disposing such basket liners in a basket is less. The present basket liner is made from sheet material, as opposed to a more expensive plastic. And, the present basket liner may be rapidly disposed in a basket via an automated method, or rapidly by hand, as opposed to having to be substantially formed and sewn into a basket, thereby saving time and labor costs.

Referring to FIGS. 1–4, designated generally by the reference numeral 10 is a basket liner which is pre-formed and constructed from a sheet of material 12 in accordance with the present invention for lining at least a portion of a basket. The basket liner 10 has an upper end 14, a lower end 16, and an outer periphery 18 which forms an outer surface 20, an opening 22 being formed in the basket liner 10 with a portion of the opening 22 intersecting the upper end 14 of the basket liner 10 forming an inner periphery 24 and an inner surface 26. The portion of the basket liner 10, extending from the upper end 14 to the lower end 16 is termed the base 28. Attached to the base 28, at the opening 22, is a skirt 30. The skirt 30 shown herein is square, and pleated, but it will be appreciated that any shape or size of skirt 30 may be connected to the base 28, and extend from the base 28. It will also be understood that the skirt 30 can be formed from a portion of the sheet of material 12, or the skirt 30 may be formed from another sheet of material 12 which is attached to the base 30 near the opening 22, such attachment being made via bonding material, heat sealing the skirt 30 to the base 28, or by any other method known in the art. The skirt 30 shown in FIGS. 1, 3, and 4, has an upper surface 32 which is contiguous with the inner surface 26 of the base 28, a lower surface 34 which is contiguous with the outer surface 20 of the base 28, and an outer periphery 36.

The skirt 30 may be decorative, that is, have any manner of decorative material used therein. Further, decorative designs may be utilized, such as a ruffled design in the skirt, a scalloped design around the edge of the skirt (not shown), or any other designs known in the art. It will be appreciated that the basket liner 10 may be formed without a skirt 30, having only a base 28, as shown in FIGS. 5–12.

Referring back to FIGS. 1–4, it will be understood that the basket liner 10 is preformed from a sheet of material 12, and will retain its preformed shape. The basket liner 10, is also substantially flexible, and substantially non-tearable.

Figure 1:
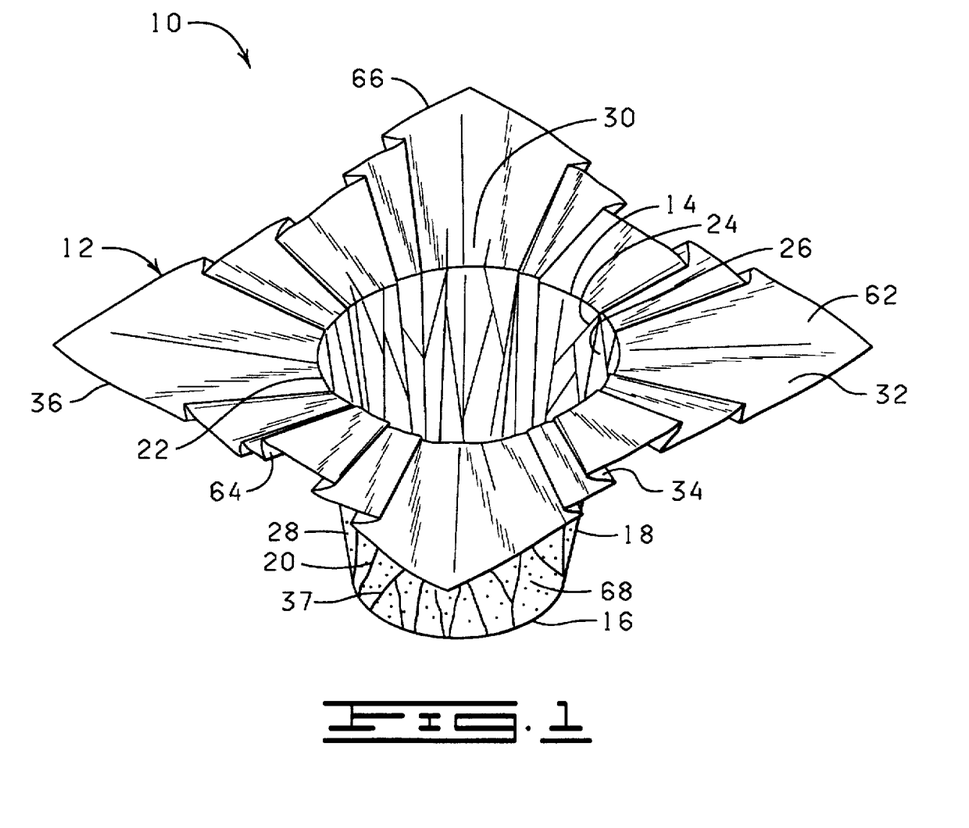
FIG. 1 is a perspective view of the basket liner of the present invention.

The base 28 of the basket liner 10 has formed therein overlapping folds 37 (only one such overlapping fold being designated with reference numeral 37 in FIG. 1). The overlapping folds 37 extend at different angles and over different lengths, being generally asymmetrical and non-geometric in form. The skirt 30 of the basket liner 10 may also have overlapping folds 37.

Materials and methods of forming a sheet of material 12 into an article, such an article including a basket liner, is disclosed in U.S. Pat. No. 4,773,182, entitled, "Article Forming System," U.S. Pat. No. 4,897,031, entitled, "Article Forming System," and U.S. Pat. No. 5,208,027, entitled "Article Forming System," all of which are hereby incorporated by reference herein.

Figure 3:
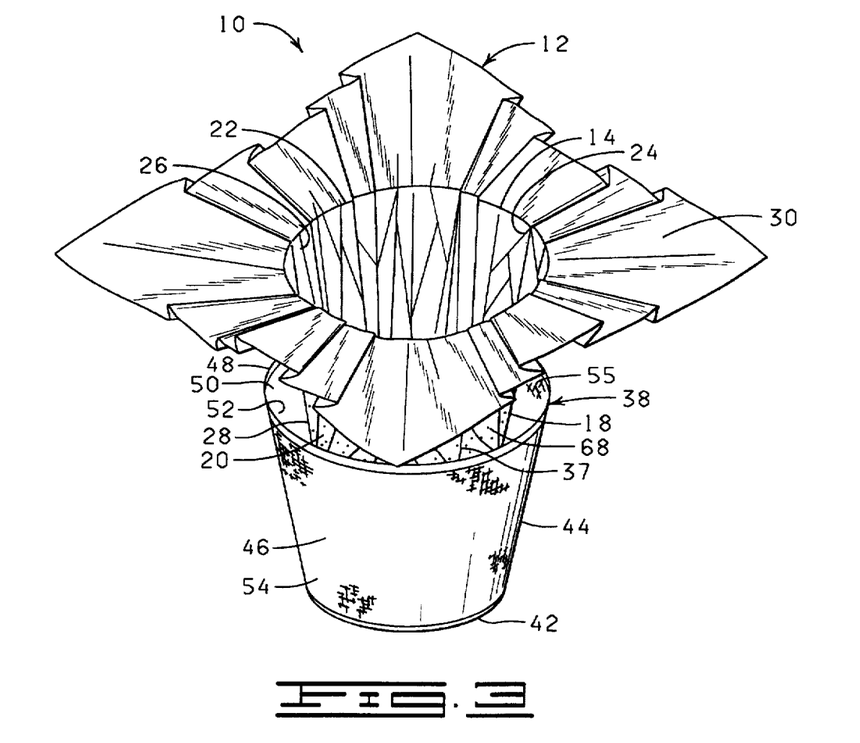
FIG. 3 is a perspective view of the basket liner of FIG. 1, partially disposed in the basket of FIG. 2.
Figure 4:
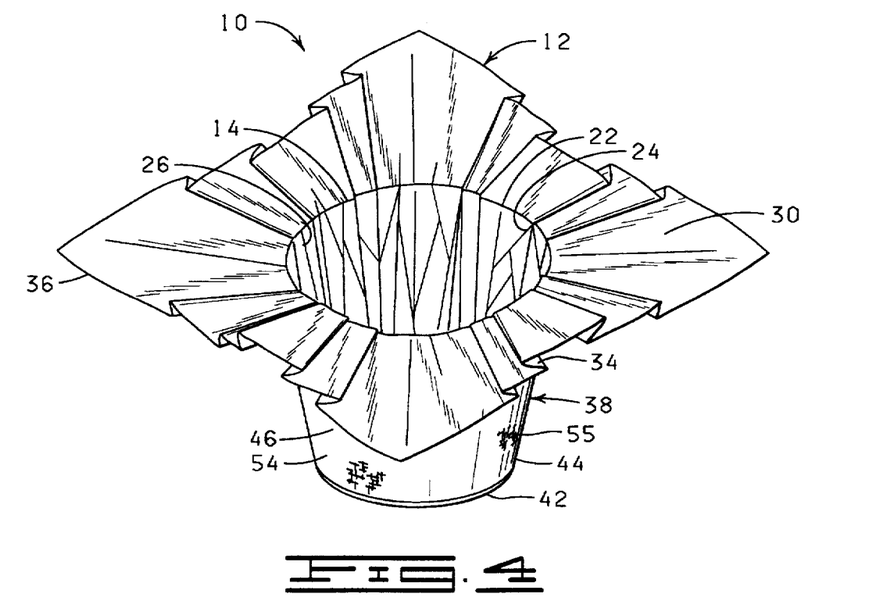
FIG. 4 is a perspective view of the basket liner of FIG. 1, disposed in the basket of FIG. 2.
Figure 5:
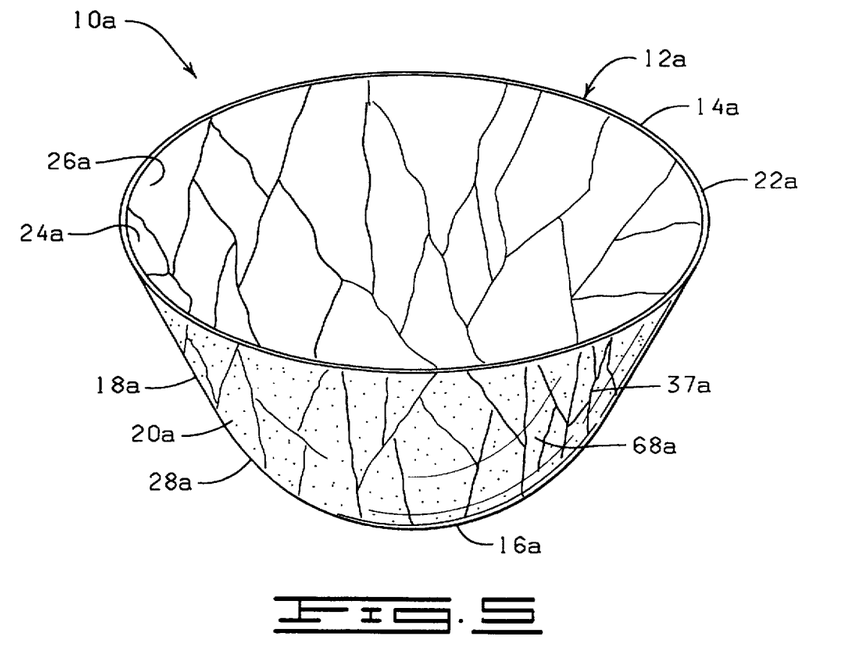
FIG. 5 is a perspective view of another embodiment of the basket liner of the present invention, this modified basket liner having no skirt.
Figure 6:
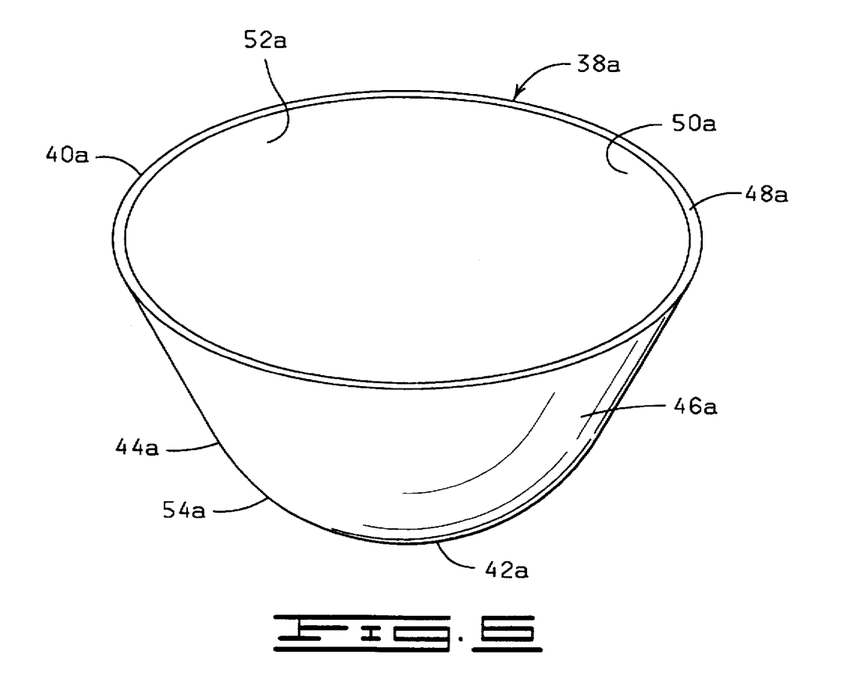
FIG. 6 is a perspective view of a modified basket used in conjunction with the present invention as shown in FIG. 5.

It will be appreciated that the basket liner 10 may form any shape or size, including, but not by way of limitation, any geometric, non-geometric, asymmetric of fanciful shape and/or size. It will also be appreciated that the base 28 of the basket liner 10 and/or the skirt 30 of the basket liner 10 may vary in size and/or in shape. The "base," as used herein, includes both the portions of the basket liner 10 extending generally between the lower end 16 and the upper end 14 of the basket liner 10 as well as the portions extending about the outer periphery 18 and the outer surface 20, which may follow the contours of the inner surface of a basket 38 (in this instance, as shown in FIGS. 3–4, the frusto-conical shape of the basket), before extending into a skirt 30. Alternatively, however, the basket liner 10 may comprise a size and/or shape which does not conform or correspond precisely to the size and/or shape of the basket 38 it will be disposed in. Such alternative and differing sizes and shapes of the basket liner 10 may be used to create unique design appearances within the basket 38 using one or more basket liners 10 (for instance, a heart-shaped basket liner is disposed in a square basket for Valentine's Day).

Figure 2:
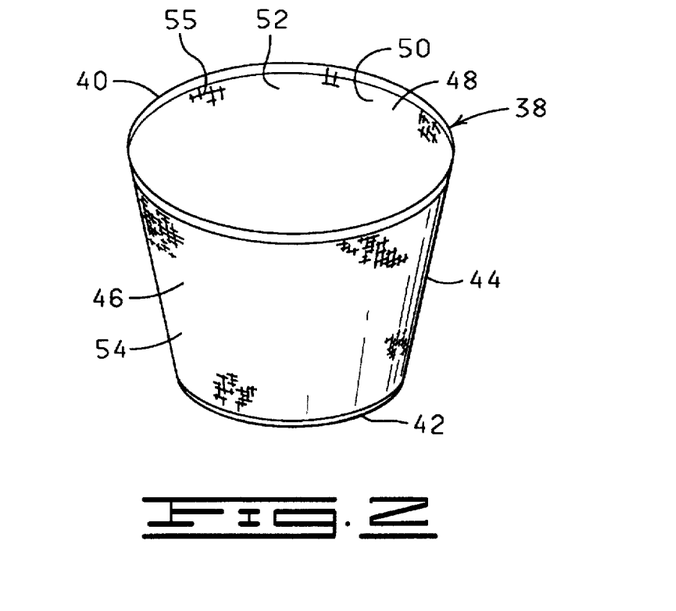
FIG. 2 is a perspective view of a basket used in conjunction with the present invention, the cross-hatching representing the texture and contour of both the inner and outer surfaces of the basket.

One type of basket is shown in FIGS. 2–4, and is generally designated by the numeral 38. The basket 38 has an upper end 40, a lower end 42, and an outer periphery 44 which forms an outer surface 46, an opening 48 being formed in the basket 38 with a portion of the opening 48 intersecting the upper end 40 of the basket 38 forming an inner periphery 50 and an inner surface 52. This portion of the basket 38, extending from the upper end 40 to the lower end 42 and including, but not limited to, the inner periphery 50 and the inner surface 52 is the base 54. The basket has contours 55 (only one contour designated by the reference numeral 55 in FIG. 2) which comprises contours 55 formed within the basket 38, and which are at least partially exposed upon the inner surface 52 of the basket 38. Such contours include, but not by way of limitation, textures, shapes, or any combination thereof.

The basket opening 48 is sized and shaped for receiving items (not shown), and the items are retained in the basket opening 48 by the basket 38. Baskets 38 may be made from a variety of materials. Such materials include, but not by way of limitation, wicker, wood, fiber (natural or synthetic), paper, grain, plastic, metal, glass, burlap, leather, or combinations thereof. Examples of baskets 38 which are used in accordance with the present invention include, but are not limited to, fruit baskets, gift baskets, Easter baskets, and picnic baskets. Further, the term "basket" as used herein includes trays, such as food trays, display trays, and produce trays. Another type of basket contemplated by the present invention are baskets used to contain a pot, such as a flower pot, which may contain living plants within the pot. The term "flower pot" means any type of floral container used to hold plants. In a further alternative, the basket 38 may contain a floral grouping (not shown).

"Floral grouping" as used herein means cut fresh flowers, artificial flowers, other fresh and/or artificial plants or other floral materials and may include other secondary plants and/or ornamentation which add to the aesthetics of the overall floral grouping. The floral grouping comprises a flower portion which may comprise either a bloom or foliage portion (not shown), and a stem portion (not shown). However, it will be appreciated that the floral grouping may consist of only a single bloom or only foliage (not shown).

The basket 38 may comprise any size or shape. That is, the basket 38 may form any geometric shape, non-geometric shape, asymmetrical shape, fanciful shape (such as a heart or a flower), or any combination thereof.

Referring to FIGS. 1, and 3–4, the basket liner 10 is formed from a sheet of material 12. The sheet of material 12 generally has an upper surface 62, a lower surface 64, and an outer periphery 66 (the sheet of material 12 being shown in FIG. 1 only after being formed into a basket liner 10).

The sheet of material 12 has a thickness in a range from about 0.1 mils to about 30 mils. Preferably, the sheet of material 10 has a thickness in a range from about 0.1 mils to about 5 mils.

The sheet of material 12 may be any shape, a square shape being generally suggested in FIG. 1 only by way of example. The sheet of material 12, however, may be square, rectangular, circular or any other geometric shape. Further, the sheet of material 12 may be any non-geometric or fanciful shape, such as heart shaped, for example only. It will be appreciated that the shape of the sheet of material 12 does not necessarily need to conform with the shape of the basket 38 requiring a basket liner 10, that is, a round sheet of material 12 may be formed to line a square basket 38, the round sheet of material 12 being formed into a square which conforms to the inner surface 52 of the basket 38. Alternatively, however, special design effects may be achieved by forming a basket liner 10 into a round shape, for instance, and then placing the round shaped basket liner 10 into a square basket 38.

The sheet of material 12 may be constructed of a single layer of material or a plurality of layers of the same or different types of materials. Any thickness of the sheet of material 12 may be utilized in accordance with the present invention as long as the sheet of material 12 is capable of flexibility and capable of being pre-formed into an object, namely, the basket liner 10 described herein. The layers of material comprising the sheet of material 12 may be connected together or laminated or may be separate layers, and the layers of material comprising the sheet of material 12 need not be uniform in shape or composition. Finally, it will be appreciated that the sheets of material 12 shown in all embodiments herein are substantially flat.

The sheet of material 12 may be constructed of a single layer of material or a plurality of layers of the same or different types of materials. Any thickness of the sheet of material 12 may be utilized in accordance with the present invention as long as the sheet of material 12 may be pre-formed into a basket liner 10, as described herein. Additionally, an insulating material such as bubble film, preferable as one of two or more layers, can be utilized in order to provide additional protection for the items to be contained within the basket liner 10. Such bubble film may be connected to the basket liner 10 by any material and any method described herein, or known in the art.

In a preferred embodiment, the first sheet of material 12 is constructed from two polypropylene films (a 20"×15" sheet of Mobil 270 ABW white opaque film laminated to a 20"×15" sheet of Mobil 220 AB clear film) having a thickness in a range of from less than about 1.0 mil to about 2.5 mils. The layers of material comprising the sheet of material 12 may be connected together or laminated or may be separate layers.

The sheet of material 12 is constructed from any suitable material that is capable of being preformed into a basket liner 10, and which functions as described herein. Preferably, the sheet of material 12 comprises paper (untreated or treated in any manner), cellophane, foil, polymer film, fabric (woven or nonwoven or synthetic or natural), burlap, or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The sheet of material 12 may vary in color. Further, the sheet of material 12 may consist of designs or decorative patterns which are printed, etched, and/or embossed thereon using inks or other printing materials. An example of an ink which may be applied to the surface of the sheet of material 12 is described in U.S. Pat. No. 5,147,706 entitled "Water Based Ink On Foil And/Or synthetic organic polymer" issued to Kingman on Sep. 15, 1992 and which is hereby incorporated herein by reference. In addition, the sheet of material 12 may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the sheet of material 12. Moreover, each surface of the sheet of material 12 may vary in the combination of such characteristics. The sheet of material 12 itself may be opaque, translucent or partially clear or tinted transparent.

A bonding material 68 may be disposed on at least a portion of the outer surface 20 of the basket liner 10. Alternatively, the basket liner 10 may be free of a bonding material 68, the bonding material 68 being instead disposed upon at least a portion of the inner surface of the basket 38. As shown in FIG. 1, the bonding material 68 is disposed in a preferred embodiment adjacent the outer surface 20 of the basket liner 10 and extends generally between the upper and lower ends 14 and 16, respectively, of the base 28 of the basket liner 10. Such bonding material 68 may also be disposed upon a portion of the skirt 30, such as a portion of the lower surface 34 of the skirt 30. As shown in FIG. 1, the bonding material 68 is disposed substantially over the outer surface 20 of the basket liner 10, although the bonding material 68 also could be applied to the outer surface 20 of the basket liner 10 in the form of spaced apart spots (FIGS. 10–12) or the bonding material 68 also could be disposed on the outer surface 20 of the basket liner 10 in any other geometric forms or non-geometric and in any pattern including covering the entire outer surface 20 of the basket liner 10, or, alternatively, the entire outer surface 20 and inner surface 26 of the basket liner 10. The term "spot" or "spots" as used herein includes any geometric shape of spot including, but not limited to, what is commonly referred to as strips, as well as non-geometric, asymmetric, or fanciful (such as a heart or daisy pattern, for example) designs.

The term "bonding material" as used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer which may be applied to the sheet of material and, in this instance, heat, sound waves, or vibrations, also must be applied to effect the sealing.

The term "bonding material" when used herein also means any type of material or thing which can be used to effect the bonding or connecting of the two adjacent portions of the material or sheet of material to effect the connection or bonding described herein. The term "bonding material" also includes ties, labels, bands, ribbons, strings, tape, staples or combinations thereof. Some of the bonding materials would secure the ends of the material while other bonding material may bind the circumference of the wrapper. Another way to secure the wrapping is to heat seal the ends of the material to another portion of the material. One way to do this is to contact the ends with an iron of sufficient heat to heat seal the material.

The term "bonding material" when used herein also means any heat or chemically shrinkable material, and static electrical or other electrical means, magnetic means, mechanical or barb-type fastening means or clamps, curl-type characteristics of the film or materials incorporated in the sheet of material which can cause the material to take on certain shapes, and any type of welding method which may weld portions of the sheet to itself or to the pot, or to both the sheet itself and the pot.

One such bonding material 68 is taught in U.S. Pat. No. 5,111,638, entitled, "Method For Wrapping An Object With A Material Having Pressure Sensitive Adhesive Thereon," which is hereby incorporated by reference herein. Other bonding materials 68 are known in the art and commercially available. The bonding material 68 may be disposed upon the sheet of material 12 before it is formed into a basket liner, or, alternatively, the bonding material 68 may be disposed upon the basket liner 10 after it is formed. The bonding material may be disposed by spraying, painting, brushing, lacquering, immersing at least a portion of the sheet of material 12 or the formed basket liner 10 in the bonding material 68, or mechanically, or by hand, by any method known in the art.

The bonding material 68 described herein may be provided with at least one release strip (not shown). A release strip is used to protect the bonding material disposed on the basket liner 10, before the basket liner 10 is disposed adjacent the inner surface 26 of the basket 38. A release strip has an upper surface, a lower surface, and an outer periphery. One surface of the release strip is disposed adjacent the bonding material 68 on the outer surface 20 of the basket liner 10. It will be appreciated that the release strip is also substantially flat, and that the release strip is removed prior to disposing the basket liner 10 into a basket 38.

FIGS. 3–4 illustrate one method of use of the present invention. First, both a preformed basket liner 10, and a basket 38, as described in detail above, are provided. Items, namely, items which are sized and shaped to fit into a basket, may also be provided. Then, the basket liner 10 is disposed through the basket opening 48 in the upper end 40 of the basket 38 with the lower end 16 of the basket liner 10 entering the opening 48 first, the lower end 16 of the basket liner 10 disposed adjacent to the inside surface 52 and the lower end 42 of the basket 42 with the upper end 14 of the basket liner 10 generally in corresponding alignment with the upper end 40 of the basket 38, both the outer periphery 18 and the outer surface 20 of the basket liner 10 also being adjacent to and in corresponding alignment with the inner periphery 50 and the inner surface 52 of the basket 38, the bonding material 68 on the outer surface 20 of the basket liner 10 disposed adjacent to and in contacting engagement with the inner surface 52 of the basket 38, the bonding material 68 disposed to bondingly contact and connect the basket liner 10 in a firm yet releasable engagement to the basket 38.

The basket liner 10 is disposed over the inner surface 52 of the basket 38 to permit the bonding material 68 on the outer surface 20 of the basket liner 10 to bondingly contact the inner surface 52 of the basket 38 for bondingly connecting the basket liner 10 to the basket 38. However, in certain applications, like portions of the outer surface 20 of the basket liner 10 may bondingly contact and connect to other like portions of the outer surface 52 of the basket liner 10, in order to more closely conform to the contours 55 on the inner surface 52 of the basket 38, forming overlapping folds which are non-geometric and extend in many different angles and over many different lengths, thereby permitting the basket liner 10 to more closely conform and correspond to the contours 55 on the inner surface 52 of the basket 38. The bonding material 68 on the outer surface 20 of the basket liner 10 contacts the inner surface 52 of the basket 38, bondingly connecting the basket liner 10 to the inner surface 52 of the basket 12. The connections of the basket liner 10 to like portions thereof and to the contours 55 and the inner surface 52 of the basket 38 produce a customized fit of the basket liner 10 to the inner surface 52 of the basket 38.

Items may be placed within the basket liner 10. The basket liner 10 remains connected to the basket 38 before, during, and after items are placed within the basket liner 10 (which is disposed within and connected to the basket 38) and retained within the basket 38.

Embodiments and Method of FIGS. 5–9

Illustrated in FIGS. 5–9 is a modified basket liner 10a and a modified basket 38a both of which are constructed exactly like the basket liner 10 and the basket 38 shown in FIGS. 1–4 and described in detail previously, except that the basket liner 10a is bowl-shaped, the basket liner 10a has no skirt 30, and the basket 38a is bowl-shaped.

Figure 7:
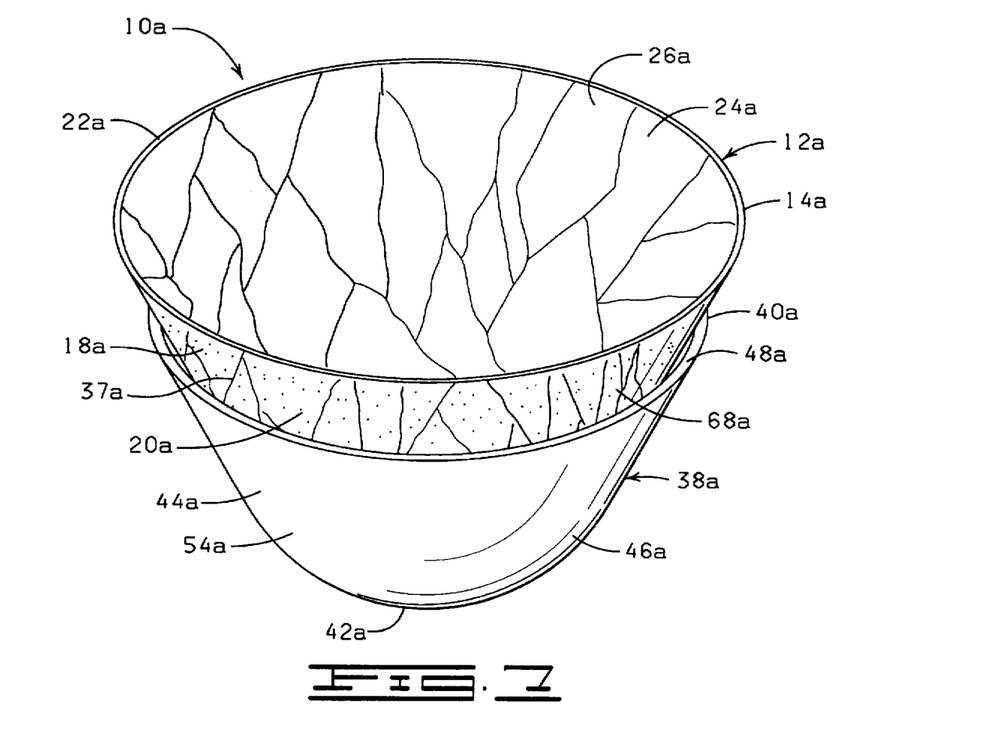
FIG. 7 is a perspective view of the basket liner of FIG. 5, partially disposed in the basket of FIG. 6.
Figure 8:
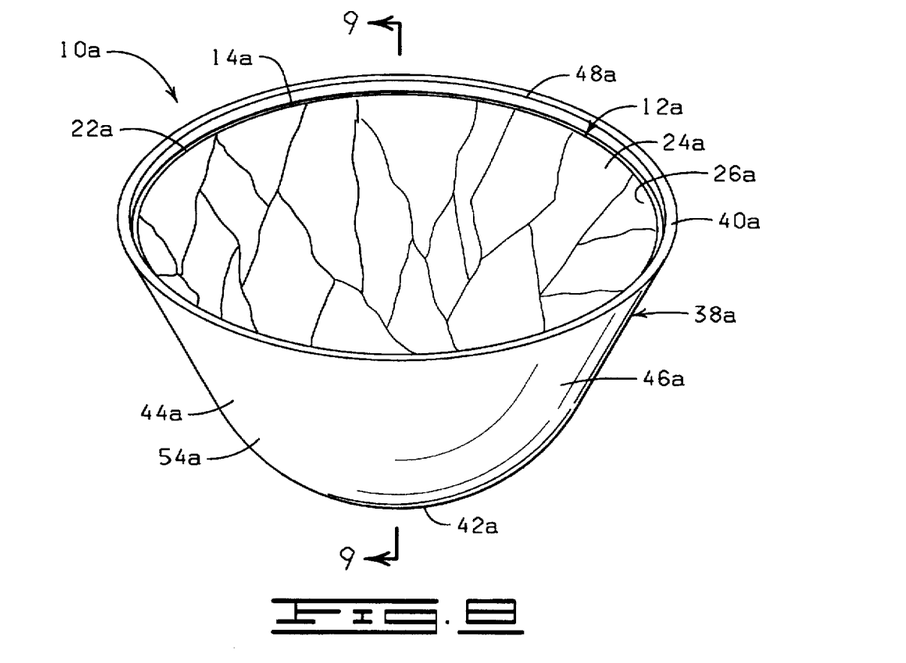
FIG. 8 is a perspective view of the basket liner of FIG. 5, disposed in the basket of FIG. 6.
Figure 9:
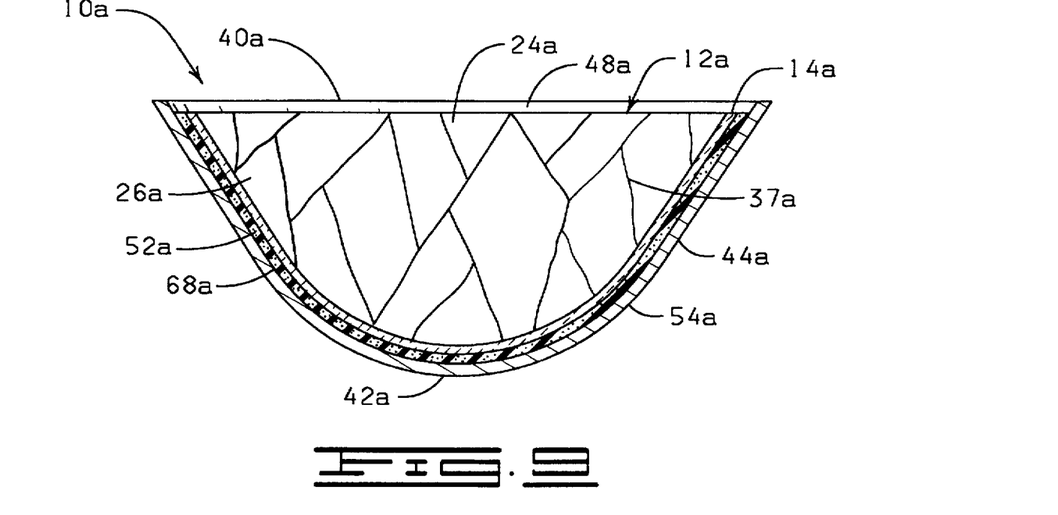
FIG. 9 is an enlarged cross-sectional partial view of FIG. 8 taken along the lines 9—9 of FIG. 8.

Referring to FIGS. 7–9, the basket liner 10a is disposed in the basket 38a by the same method shown in FIGS. 3–4 and previously described in detail.

Figure 10:
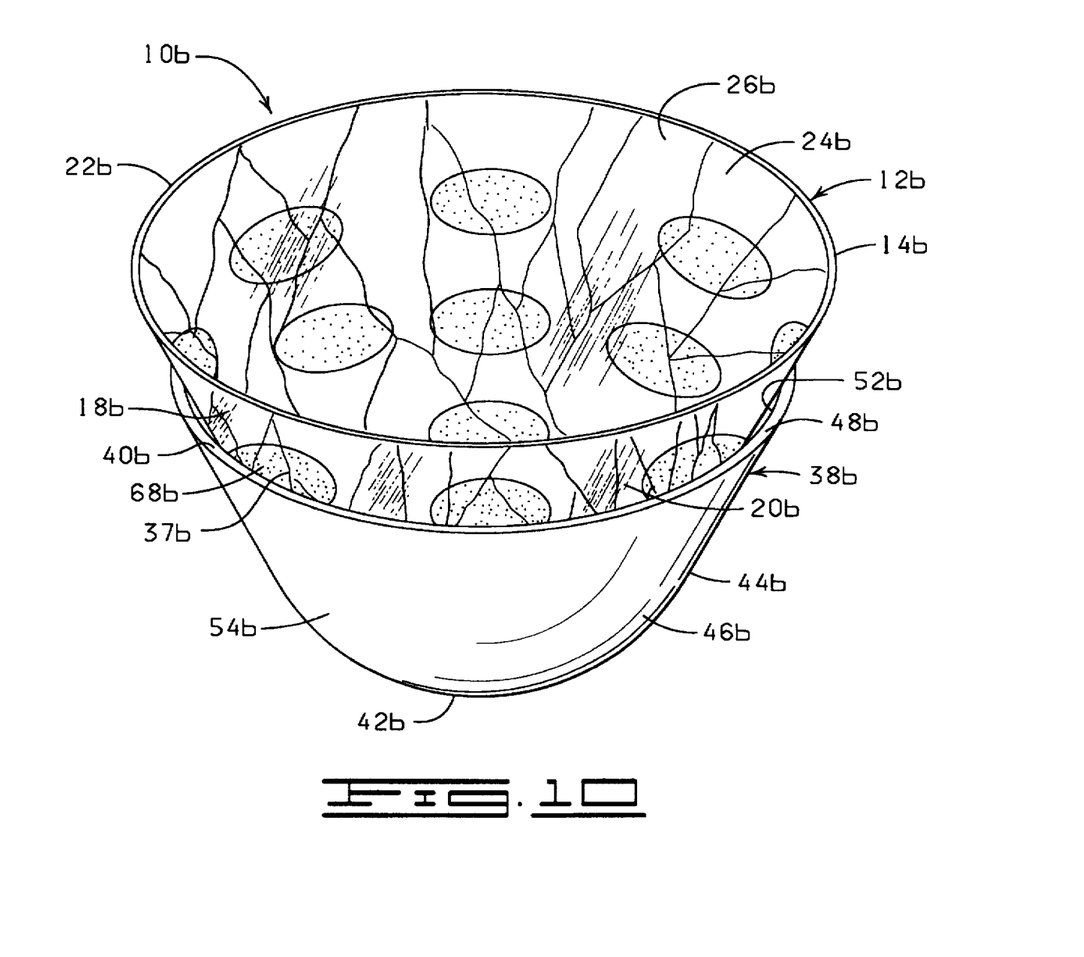
FIG. 10 is a perspective view of yet another embodiment the basket liner of the present invention, the modified basket liner shown partially disposed in a basket substantially similar to the one shown in FIG. 6.
Figure 11:
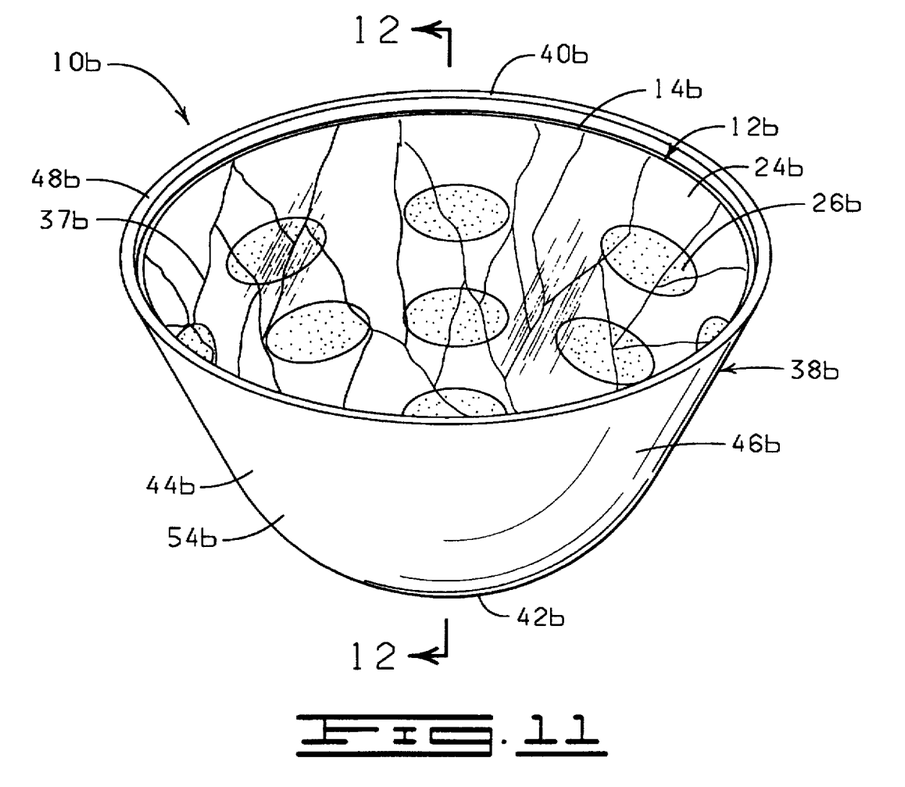
FIG. 11 is a perspective view of the modified basket liner shown in FIG. 10, disposed in the basket substantially similar to the basket shown in FIG. 6.
Figure 12:
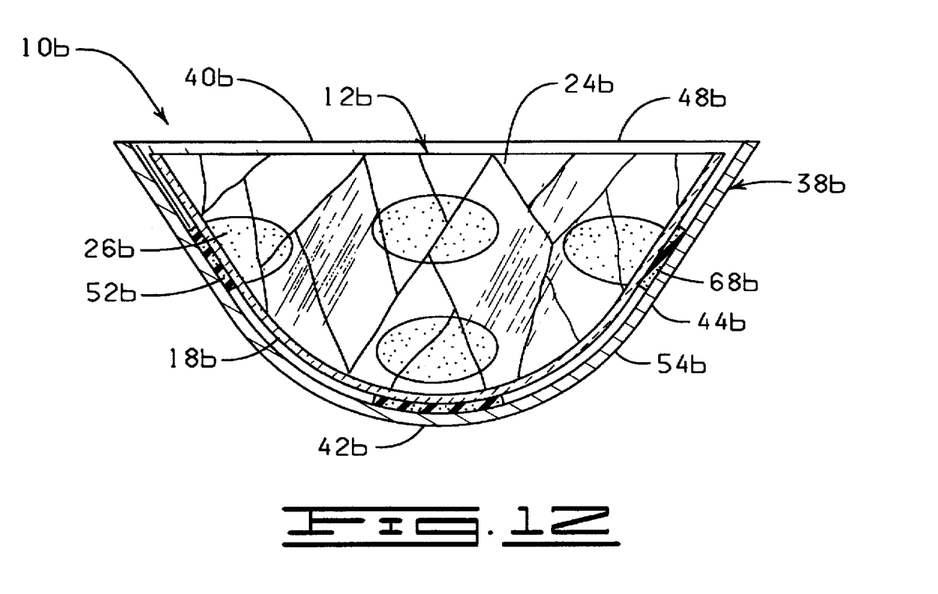
FIG. 12 is an enlarged cross-sectional partial view of FIG. 11 taken along the lines 12—12 of FIG. 11.

Embodiments and Method of FIGS. 10–12

Illustrated in FIGS. 10–12 is a modified basket liner 10b and a modified basket 38b, both of which are constructed exactly like the basket liner 10a and the basket 38a shown in FIGS. 5–9 and described in detail previously, except that the basket liner 10b has spots of bonding material 68b disposed on the outer surface 20b of the basket liner 10b.

Referring to FIGS. 10–12, the basket liner 10b is disposed in the basket 38b by the same method shown in both FIGS. 3–4 and FIGS. 7–9 previously described in detail.

In a further embodiment (not shown), the bonding material 68 is disposed upon at least a portion of the inner surface 52 of the basket 38, as well as upon a portion of the outer surface 20 of the basket liner 10. Alternatively, the bonding material 68 may be disposed only upon at least a portion of the inner surface 52 of the basket 38, while the basket liner 10 has no bonding material 68 thereon (not shown).

In a method of use (not shown) of this latter embodiment, the outer surface 20 of the basket liner 10, when disposed adjacent the inner surface 52, would be contacted by the bonding material 68 disposed upon at least a portion of the inner surface 52 of the basket. The bonding material 68 on the inner surface 52 of the basket out then bondingly contact and connect to the outer surface of the basket liner 10, for bondingly connecting the outer surface 20 of the basket liner 10 to the inner surface 52 of the basket 38, in a manner substantially similar to and consistent with the methods previously shown and described herein in detail.

In a final alternative embodiment (not shown), the basket liner 10 may be formed into a shape different from the basket 38. That is, for example, the basket liner 10 is heart-shaped, and is disposed into a square basket 38. In this alternative, only a limited portion of the basket liner 10, such as, but not by way of limitation, the outer surface 20 only at the lower end 16 of the basket liner 10 is connected to the inner surface 52 of the basket 38 only at the lower end 42 of the basket 38. It will be appreciated that the basket liner 10 will be disposed in the basket by any method shown and/or described in detail herein, the only difference in the method being that only a selected portion or selected portions of the basket liner 10 will bondingly connect to the basket 38.

Changes may be made in the embodiments of the invention described herein or in parts or elements of the embodiments described herein or in the steps or in the sequence of steps of the methods described herein without departing from the spirit and scope of the invention as defined by the following claims.

What is claimed is:

1. An article comprising:
   a basket liner, made by forming at least one sheet of material into a predetermined shape for both lining a basket and receiving an object, wherein the basket liner comprises:
   a base having a closed lower end and an open upper end and an outer periphery forming an outer surface, the open upper end intersected by an object opening extending therethrough, said object opening forming an inner surface, a bonding material disposed upon a portion of the outer surface,
   wherein the sheet of material is flexible,
   wherein folds are formed in the sheet of material such that both the outer surface of the basket liner and the inner surface of the basket liner contain folds, whereby the formed basket liner is flexible and may be substantially flattened and then unflattened to assume the original shape of the formed basket liner without substantial loss of the preformed shape thereby providing the flexible yet shape-sustaining nature of the formed basket liner,
   wherein the forming of the basket liner is accomplished by forming a portion of the sheet of material into a plurality of folds to form the base of the basket liner, said folds cooperating to retain the basket liner in the formed shape, and
   wherein the base is able to stand upright on the closed lower end thereof.

2. The basket liner of claim 1 wherein the basket liner has a decorative border extending outwardly from the open upper end of the base.

3. The basket liner of claim 2 wherein the decorative border is substantially free of substantially permanently fixed overlapping folds.

4. The basket liner of claim 1 wherein a substantial portion of the overlapping folds extend over different distances and at various and arbitrary angles.

5. The basket liner of claim 1 wherein the basket liner further comprises a sheet of material having a thickness of less than about 3.0 mils.

6. The basket liner of claim 1 wherein the basket liner further comprises a sheet of material having a thickness of less than about 30 mils.

7. The basket liner of claim 1 wherein the basket liner further comprises a bonding material comprising an adhesive.

8. The basket liner of claim 1 wherein the basket liner further comprises a bonding material comprising a cohesive.

9. The basket liner of claim 1 wherein the basket liner is formed from a sheet of material selected from the group consisting of polymer film, foil, paper, cellophane, fabric, burlap, and combinations thereof.

10. The basket liner of claim 1 where in the basket liner is formed from a sheet of material comprising a polymer film.

11. An article comprising:
    a basket liner, made by forming at least one sheet of material into a predetermined shape for both lining a basket and receiving an object, wherein the basket liner comprises:
    a base having a closed lower end and an open upper end and an outer periphery forming an outer surface, the open upper end intersected by an object opening extending therethrough, said object opening forming an inner surface, a bonding material disposed upon a portion of the outer surface,
    wherein the sheet of material is flexible,
    wherein folds are formed in the sheet of material such that both the outer surface of the basket liner and the inner surface of the basket liner contain folds, a substantial portion of the folds extending over different distances and at various and arbitrary angles, whereby the formed basket liner is flexible and may be substantially flattened and then unflattened to assume the original shape of the formed basket liner without substantial loss of the preformed shape thereby providing the flexible yet shape-sustaining nature of the formed basket liner,
    wherein the forming of the basket liner is accomplished by forming a portion of the sheet of material into a plurality of folds to form the base of the basket liner, said folds cooperating to retain the basket liner in the formed shape, and
    wherein the base is able to stand upright on the closed lower end thereof.

12. The basket liner of claim 11 wherein the basket liner has a decorative border extending outwardly from the open upper end of the base.

13. The basket liner of claim 12 wherein the decorative border is substantially free of folds.

14. The basket liner of claim 11 wherein the basket liner is formed from a sheet of material selected from the group consisting of polymer film, foil, paper, cellophane, fabric, burlap, and combinations thereof.

15. The basket liner of claim 11 wherein the basket liner further comprises a sheet of material having a thickness of less than about 3.0 mils.

16. The basket liner of claim 11 wherein the basket liner further comprises a sheet of material having a thickness of less than about 30 mils.

17. The basket liner of claim 11 wherein the basket liner further comprises a bonding material comprising an adhesive.

18. The basket liner of claim 11 wherein the basket liner further comprises a bonding material comprising a cohesive.

19. The basket liner of claim 11 where in the basket liner is formed from a sheet of material comprising a polymer film.

20. An article comprising:
   a basket liner, made by forming at least one sheet of material into a predetermined shape for both lining a basket and receiving an object, wherein the basket liner comprises:
      a base having a closed lower end and an open upper end and an outer periphery forming an outer surface, the open upper end intersected by an object opening extending therethrough, said object opening forming an inner surface, a decorative border extending outwardly from the open upper end of the base, a bonding material disposed upon a portion of the outer surface,
   wherein the sheet of material is flexible,
   wherein folds are formed in the sheet of material such that both the outer surface of the basket liner and the inner surface of the basket liner contain folds, whereby the formed basket liner is flexible and may be substantially flattened and then unflattened to assume the original shape of the formed basket liner without substantial loss of the preformed shape thereby providing the flexible yet shape-sustaining nature of the formed basket liner,
   wherein the forming of the basket liner is accomplished by forming a portion of the sheet of material into a plurality of folds to form the base of the basket liner, said folds cooperating to retain the basket liner in the formed shape, and
   wherein the base is able to stand upright on the closed lower end thereof.

21. The basket liner of claim 20 wherein the decorative border is substantially free of folds.

22. The basket liner of claim 20 wherein a substantial portion of the folds extend over different distances and at various and arbitrary angles.

23. The basket liner of claim 20 wherein the basket liner is formed from a sheet of material selected from the group consisting of polymer film, foil, paper, cellophane, fabric, burlap, and combinations thereof.

24. The basket liner of claim 20 wherein the basket liner further comprises a sheet of material having a thickness of less than about 3.0 mils.

25. The basket liner of claim 20 wherein the basket liner further comprises a sheet of material having a thickness of less than about 30 mils.

26. The basket liner of claim 20 wherein the basket liner further comprises a bonding material comprising an adhesive.

27. The basket liner of claim 20 wherein the basket liner further comprises a bonding material comprising a cohesive.

28. The basket liner of claim 20 where in the basket liner is formed from a sheet of material comprising a polymer film.

29. An article comprising:
   a basket liner, made by forming at least one sheet of material into a predetermined shape for both lining a basket and receiving an object, wherein the basket liner comprises:
      a base having a closed lower end and an open upper end and an outer periphery forming an outer surface, the open upper end intersected by an object opening extending therethrough, said object opening forming an inner surface, a bonding material comprising an adhesive disposed upon a portion of the outer surface,
   wherein the sheet of material is flexible,
   wherein folds are formed in the sheet of material such that both the outer surface of the basket liner and the inner surface of the basket liner contain folds, whereby the formed basket liner is flexible and may be substantially flattened and then unflattened to assume the original shape of the formed basket liner without substantial loss of the preformed shape thereby providing the flexible yet shape-sustaining nature of the formed basket liner,
   wherein the forming of the basket liner is accomplished by forming a portion of the sheet of material into a plurality of folds to form the base of the basket liner, said folds cooperating to retain the basket liner in the formed shape, and
   wherein the base is able to stand upright on the closed lower end thereof.

30. The basket liner of claim 29 wherein the basket liner has a decorative border extending outwardly from the open upper end of the base.

31. The basket liner of claim 30 wherein the decorative border is substantially free of folds.

32. The basket liner of claim 29 wherein a substantial portion of the folds extend over different distances and at various and arbitrary angles.

33. The basket liner of claim 29 wherein the basket liner is formed from a sheet of material selected from the group consisting of polymer film, foil, paper, cellophane, fabric, burlap, and combinations thereof.

34. The basket liner of claim 29 wherein the basket liner further comprises a sheet of material having a thickness of less than about 3.0 mils.

35. The basket liner of claim 29 wherein the basket liner further comprises a sheet of material having a thickness of less than about 30 mils.

36. The basket liner of claim 11 where in the basket liner is formed from a sheet of material comprising a polymer film.

37. An article comprising:
   a basket liner, made by forming at least one sheet of material into a predetermined shape for both lining a basket and receiving an object, wherein the basket liner comprises:
      a base having a closed lower end and an open upper end and an outer periphery forming an outer surface, the open upper end intersected by an object opening extending therethrough, said object opening forming an inner surface, a bonding material comprising a cohesive disposed upon a portion of the outer surface,
   wherein the sheet of material is flexible,
   wherein folds are formed in the sheet of material such that both the outer surface of the basket liner and the inner surface of the basket liner contain folds, whereby the formed basket liner is flexible and may be substantially flattened and then unflattened to assume the original shape of the formed basket liner without substantial loss of the preformed shape thereby providing the flexible yet shape-sustaining nature of the formed basket liner,
   wherein the forming of the basket liner is accomplished by forming a portion of the sheet of material into a plurality of folds to form the base of the basket liner, said folds cooperating to retain the basket liner in the formed shape, and wherein the base is able to stand upright on the closed lower end thereof.

38. The basket liner of claim 37 wherein the basket liner has a decorative border extending outwardly from the open upper end of the base.

39. The basket liner of claim 38 wherein the decorative border is substantially free of folds.

40. The basket liner of claim 37 wherein a substantial portion of the folds extend over different distances and at various and arbitrary angles.

41. The basket liner of claim 37 wherein the basket liner is formed from a sheet of material selected from the group consisting of polymer film, foil, paper, cellophane, fabric, burlap, and combinations thereof.

42. The basket liner of claim 37 wherein the basket liner further comprises a sheet of material having a thickness of less than about 3.0 mils.

43. The basket liner of claim 37 wherein the basket liner further comprises a sheet of material having a thickness of less than about 30 mils.

44. The basket liner of claim 37 where in the basket liner is formed from a sheet of material comprising a polymer film.

45. An article comprising:

a basket liner, made by forming at least one sheet of material into a predetermined shape for both lining a basket and receiving an object, wherein the basket liner comprises:

a base having a closed lower end and an open upper end and an outer periphery forming an outer surface, the open upper end intersected by an object opening extending therethrough, said object opening forming an inner surface, a bonding material disposed upon a portion of the outer surface, wherein the sheet of material is flexible, wherein folds are formed in the sheet of material such that both the outer surface of the basket liner and the inner surface of the basket liner contain folds, whereby the formed basket liner is flexible and may be substantially flattened and then unflattened to assume the original shape of the formed basket liner without substantial loss of the preformed shape thereby providing the flexible yet shape-sustaining nature of the formed basket liner, wherein the forming of the basket liner is accomplished by forming a portion of the sheet of material into a plurality of folds to form the base of the basket liner, said folds cooperating to retain the basket liner in the formed shape.

46. The basket liner of claim 45 wherein the basket liner has a decorative border extending outwardly from the open upper end of the base.

47. The basket liner of claim 46 wherein the decorative border is substantially free of folds.

48. The basket liner of claim 45 wherein a substantial portion of the folds extend over different distances and at various and arbitrary angles.

49. The basket liner of claim 45 wherein the basket liner is formed from a sheet of material selected from the group consisting of polymer film, foil, paper, cellophane, fabric, burlap, and combinations thereof.

50. The basket liner of claim 45 wherein the basket liner further comprises a sheet of material having a thickness of less than about 3.0 mils.

51. The basket liner of claim 45 wherein the basket liner further comprises a sheet of material having a thickness of less than about 30 mils.

52. The basket liner of claim 45 wherein the basket liner further comprises a bonding material comprising an adhesive.

53. The basket liner of claim 45 wherein the basket liner further comprises a bonding material comprising a cohesive.

54. The basket liner of claim 45 where in the basket liner is formed from a sheet of material comprising a polymer film.

* * * * *

UNITED STATES PATENT AND TRADEMARK OFFICE
CERTIFICATE OF CORRECTION

PATENT NO. : 5,616,383
DATED : April 1, 1997
INVENTOR(S) : Donald E. Weder

It is certified that error appears in the above-identified patent and that said Letters Patent is hereby corrected as shown below:

Cover Sheet, under 'Related U.S. Application Data Section [60]', line 1, after 'abandoned and ', please insert --113,873, is also--.

Cover Sheet, under 'Related U.S. Application Data Section [60]', line 3, after 'Oct. 21,' please delete "1993", and substitute therefor --1991--.

Cover Sheet, under 'Related U.S. Application Data Section [60]', line 11, please delete "464,644", and substitute therefor --464,694--.

Cover Sheet, under 'Related U.S. Application Data Section [60]', line 20, please delete "division", and substitute therefor --continuation--.

Column 1, lines 12-14, please delete "METHOD FOR WRAPPING AN OBJECT WITH A MATERIAL HAVING PRESSURE SENSITIVE ADHESIVE THEREON", and substitute therefor --METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL--.

Column 1, Lines 16-21, please delete "METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL", and substitute therefor --METHODS FOR WRAPPING A FLORAL GROUPING--.

UNITED STATES PATENT AND TRADEMARK OFFICE
CERTIFICATE OF CORRECTION

PATENT NO. : 5,616,383
DATED : April 1, 1997
INVENTOR(S) : Donald E. Weder

It is certified that error appears in the above-identified patent and that said Letters Patent is hereby corrected as shown below:

Column 1, line 26, please delete "divisional", and substitute therefor --continuation--.

Column 8, line 1, after 'basket', please delete "42", and substitute therefor --38--.

Column 8, line 20, after 'outer surface', please delete "52", and substitute therefor --20--.

Column 8, line 30, after 'basket', please delete "12", and substitute therefor --38--.

Signed and Sealed this

Seventh Day of October, 1997

Attest:

BRUCE LEHMAN

*Attesting Officer*       *Commissioner of Patents and Trademarks*